United States Patent
Hayashi

[11] Patent Number: 5,888,403
[45] Date of Patent: Mar. 30, 1999

[54] WATER TREATMENT PROCESS AND SYSTEM

[76] Inventor: Yukiko Hayashi, 2239-2, Kurotsuchi-cho, Sakai-shi, Osaka-fu, Japan

[21] Appl. No.: 750,092
[22] PCT Filed: May 29, 1996
[86] PCT No.: PCT/JP96/01456
§ 371 Date: Nov. 11, 1996
§ 102(e) Date: Nov. 11, 1996
[87] PCT Pub. No.: WO97/08103
PCT Pub. Date: Mar. 6, 1997

[30] Foreign Application Priority Data

Aug. 23, 1995 [JP] Japan ................................. 7-213864
Jan. 10, 1996 [JP] Japan ................................. 8-001858

[51] Int. Cl.⁶ .................................................. C02F 1/48
[52] U.S. Cl. ........................ 210/695; 210/721; 210/760; 210/763; 210/806; 210/807; 210/192; 210/199; 210/201; 210/205; 210/223
[58] Field of Search ............................. 210/192, 198.1, 210/199, 201, 202, 205, 222, 223, 695, 716, 721, 760, 763, 806, 807

[56] References Cited

U.S. PATENT DOCUMENTS

| | | | |
|---|---|---|---|
| 4,098,582 | 7/1978 | Takeda | 23/293 R |
| 4,655,933 | 4/1987 | Johnson et al. | 210/758 |
| 4,879,045 | 11/1989 | Eggerichs | 210/695 |
| 4,954,263 | 9/1990 | Woodhouse | 210/695 |
| 5,130,032 | 7/1992 | Sartori | 210/763 |
| 5,145,585 | 9/1992 | Coke | 210/192 |
| 5,433,719 | 7/1995 | Johnson et al. | 210/199 |
| 5,466,367 | 11/1995 | Coate et al. | 210/760 |
| 5,505,856 | 4/1996 | Campen et al. | 210/760 |
| 5,622,622 | 4/1997 | Johnson | 210/205 |

Primary Examiner—Jay H. Woo
Assistant Examiner—Betsey J. Morrison
Attorney, Agent, or Firm—Fildes & Outland, P.C.

[57] ABSTRACT

Water to be treated is introduced into a first ozone mixer (5) and subjected to a magnetic force, and ozone supplied from a first ozonizer (4) is injected into the water for oxidation and coagulation of substances to be oxidized. Then, coagulated substances are removed by a first filter (6). The resulting water is introduced into a second ozone mixer (8) and subjected to a magnetic force, and ozone supplied from a second ozonizer (7) is injected into the water. Thereafter, the water is passed through a reaction vessel (9) filled with activated carbon, and then coagulated substances are removed from the water by a second filter (10).

5 Claims, 6 Drawing Sheets

WATER TREATMENT PROCESS AND SYSTEM

TECHNICAL FIELD

The present invention relates to a water treatment process and a water treatment system for purifying water such as waste water, ground water, river water, lake/marsh water, sea water or reservoir water.

BACKGROUND ART

A water treatment process utilizing ozone is one of advanced water treatment processes for purifying waste water, ground water, river water, lake/marsh water, sea water, storage water or the like.

Conventionally, the water treatment process utilizing ozone comprises the steps of dissolving ozone in water and reacting the dissolved ozone with substances to be oxidized in the water.

More specifically, the process employs an aerator plate disposed at the bottom of a large water vessel to diffuse fine bubbles of ozone in the water. In order to dissolve as much ozone as possible, the greatest possible water depth is provided while the bubbles are made as fine as possible. In practice, however, the depth is limited to 5 m to 6 m at the maximum and the size (diameter) of the bubble to about 20 $\mu$m at the minimum.

The process requires an ozone residence time of about 8 minutes to about 10 minutes for the reaction and a large-scale system such as having an ozone dissolution vessel and the like.

Even with such a system, the utilization factor of ozone is only about 60% to about 80%.

Where water containing inorganic substances to be oxidized such as soluble iron and manganese and organic substances is to be treated, inorganic substances more susceptible to oxidization are first oxidized by ozone injected into the water, so that the decomposition of the organic substances by oxidation is slowed.

This is because the oxidization of the inorganic substances entails production of colloidal substances which consume ozone. Accordingly, the amount of ozone used in a process for the decomposition of the organic substances reaches several times an amount required for the intended treatment.

Although the aforesaid problem may be solved by injecting ozone again after removal of the colloidal substances, the colloidal substances have particle diameters on the order of submicron and are difficult to be removed as they are.

Therefore, a need exists for adding a coagulant to increase particle diameters of the colloidal substances for separation and removal thereof.

Such a treatment requires additional facilities such as a reaction vessel and an apparatus for adding the coagulant. Furthermore, the addition of the coagulant results in an increase of waste products.

In view of the foregoing, it is an object of the present invention to provide a simplified water treatment process and system which are capable of purifying water without addition of a coagulant and offer an improved use efficiency of ozone.

DISCLOSURE OF INVENTION

A water treatment process of the present invention comprises the steps of: injecting ozone into water to be treated, while applying a magnetic force to the water, for oxidation and coagulation of substances to be oxidized; filtering away coagulated substances; injecting ozone into the resulting water, while applying a magnetic force to the water; passing the resulting water through a catalytic layer of activated carbon; and filtering away coagulated substances.

A water treatment system of the present invention comprises: first and second ozone generators; a first magnetic treatment reaction vessel including a magnetic treatment section for introducing therein water to be treated and applying a predetermined magnetic force to the water, and an ozone injecting/mixing section for injecting ozone generated by the first ozone generator into the water introduced from the magnetic treatment section and mixing the ozone with the water; a first filter for filtering away coagulated substances from the water introduced from the first magnetic treatment reaction vessel; a second magnetic treatment reaction vessel including a magnetic treatment section for introducing therein the water from the first filter and applying a predetermined magnetic force to the water, and an ozone injecting/mixing section for injecting ozone generated by the second ozone generator into the water introduced from the magnetic treatment section and mixing the ozone with the water; a reaction vessel in which the water introduced from the second magnetic treatment reaction vessel is subjected to oxidation and decomposition by a catalytic layer of activated carbon; and a second filter for filtering away coagulated substances from the water introduced from the reaction vessel.

With the arrangement of the aforesaid water treatment system, when the water to be treated is subjected to oxidation by ozone, colloidal substances produced by oxidation of inorganic substance and suspended matter produced by oxidation of organic substances can be coagulated by the application of the magnetic force without the use of a coagulant and the like.

In another water treatment system of the present invention having substantially the same construction as the aforesaid water treatment system, the ozone injecting/mixing section of the magnetic treatment reaction vessel comprises: a vane member disposed in a mixing cylinder member, the vane member including a pair of semicircular vanes inclined at a predetermined angle with respect to a direction of flow of the water and provided in a twisted relation; a partition for dividing a space upstream of the intersection of the pair of vanes into two lateral portions; and a plurality of projections provided on the downstream side of the vane member within the mixing cylinder member and each having a cylindrical portion fixed onto an interior wall of the mixing cylinder member and a mushroom-like portion provided atop the cylindrical portion, the plurality of projections being arranged in a staggered (zigzag) fashion on the interior wall of the mixing cylinder member.

With the arrangement of the ozone injecting/mixing section, the pair of vanes provided in the mixing cylinder portion diverge the water flow into two flows, which are twisted in opposite directions. The flows are further diverged by the projections provided on the downstream side and deflected in a radial direction of the mixing cylinder member. Thus, the vigorous diverging/bumping action of the flows causes ozone to react with the water at a high rate.

BEST MODE FOR CARRYING OUT THE INVENTION

Figure 1:
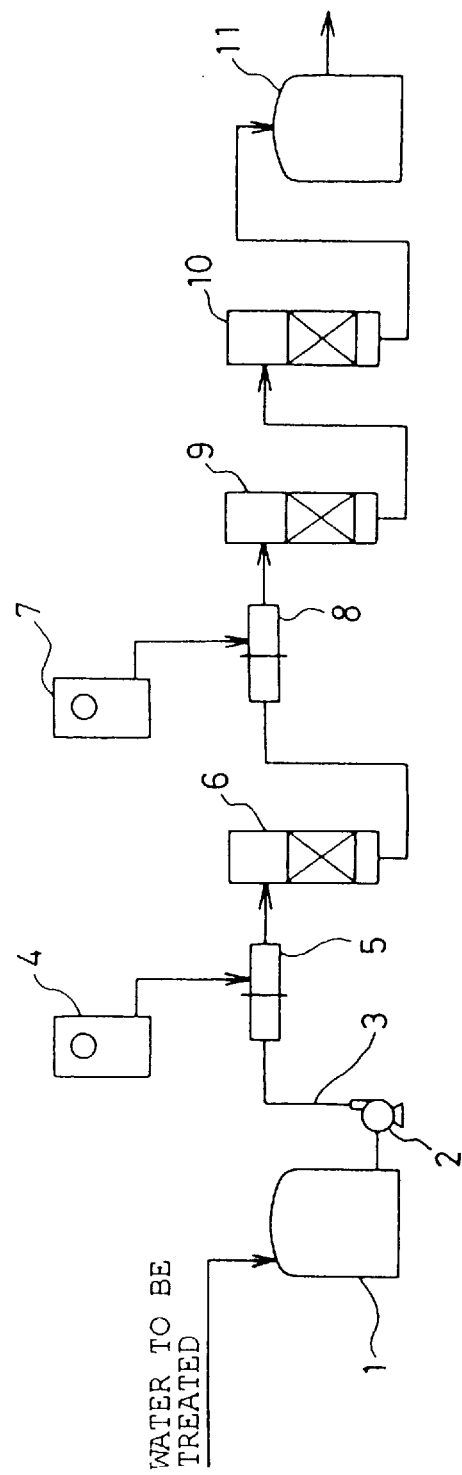
FIG. 1 is a schematic view illustrating the construction of a water treatment system according to one mode of the present invention.

The construction of a water treatment system of the present invention will hereinafter be described with reference to FIGS. 1 and 2.

The water treatment system includes a reservoir 1 for storing a water to be treated; a first ozone mixer (first magnetic treatment reaction vessel) 5 for receiving the water introduced from the reservoir 1 through a transportation pipe line 3 provided with a pump 2, applying a predetermined magnetic force to the water, injecting (or sucking) ozone (ozone gas) generated by a first ozonizer (first ozone generator) 4 into the water, and mixing the ozone with the water, thereby coagulating substances to be oxidized in the water; a first filter 6 for removing coagulated substances or reaction products coagulated in the first ozone mixer 5; a second ozone mixer (second magnetic treatment reaction vessel) 8 for receiving the water free from the coagulated substances filtered away by the first filter 6, applying a predetermined magnetic force to the water, injecting (or sucking) ozone (ozone gas) generated by a second ozonizer (second ozone generator) 7 into the water, and mixing the ozone with the water, thereby coagulating substances to be oxidized in the water; a reaction vessel 9 in which the water introduced from the second ozone mixer 8 is brought into contact with granular activated carbon (catalytic layer) serving as a catalyst for a reaction; a second filter 10 for removing substances (reaction products) oxidized and decomposed in the reaction vessel 9; and a treated-water reservoir 11 for storing the water thus treated or the water free from the decomposed substances removed by the second filter 10.

Figure 2:
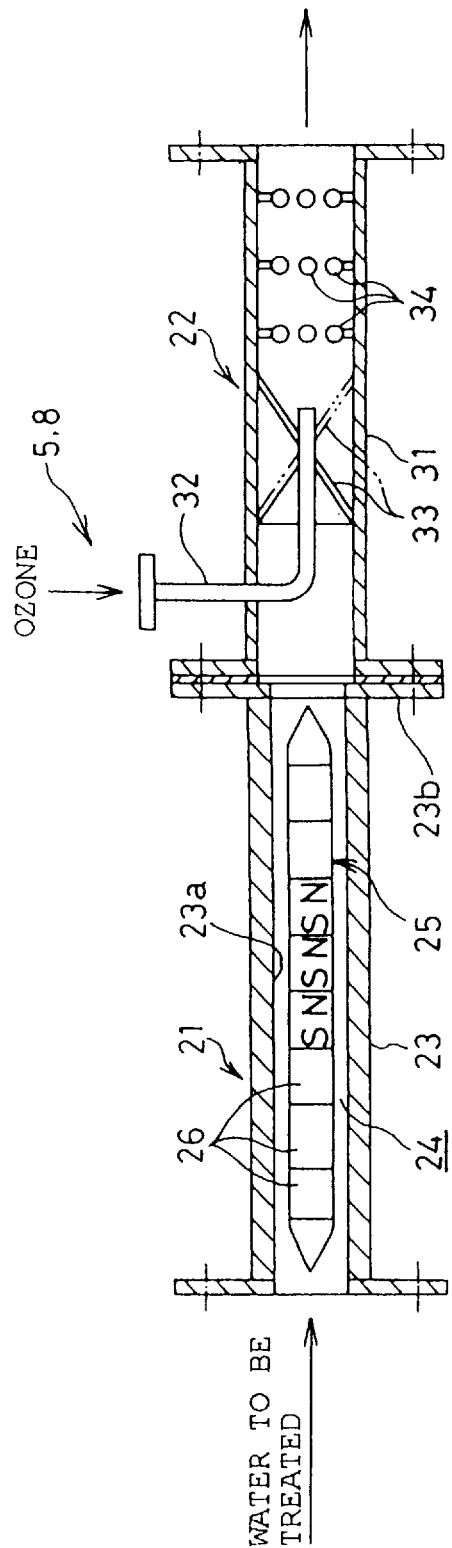
FIG. 2 is a sectional view illustrating a magnetic treatment reaction vessel of the water treatment system.

As shown in FIG. 2, the ozone mixers 5 and 8 each include a magnetic treatment section 21 and an ozone injecting/mixing section 22.

The magnetic treatment section 21 includes a cylinder member 23 (such as of a PVC pipe) having a predetermined diameter and length, and a bar magnet member 25 inserted in the cylinder member and having an outer diameter such that a predetermined clearance (defining an annular passage and depending on a flow rate of the water) is provided with respect to an interior wall 23a of the cylinder member and a length a little smaller than that of the cylinder member 23.

The bar magnet member 25 includes a plurality of small cylindrical magnets 26 arranged in series such that the N-poles and S-poles thereof oppose each other. Used as the small magnets 26 are permanent magnets.

The ozone injecting/mixing section 22 includes a mixing cylinder member 31 connected to a flange 23b of the cylinder member 23 of the magnetic treatment section 21, an L-shaped ozone injection tube (ozone suction tube) 32 inserted from the upstream side of the mixing cylinder member 31, an agitating vane member 33 provided adjacent to the ozone injection tube 32 within the mixing cylinder member 31, and a plurality of agitating/mixing projections 34 provided inside the mixing cylinder member 31 downstream of the vane member 33.

Figure 3:
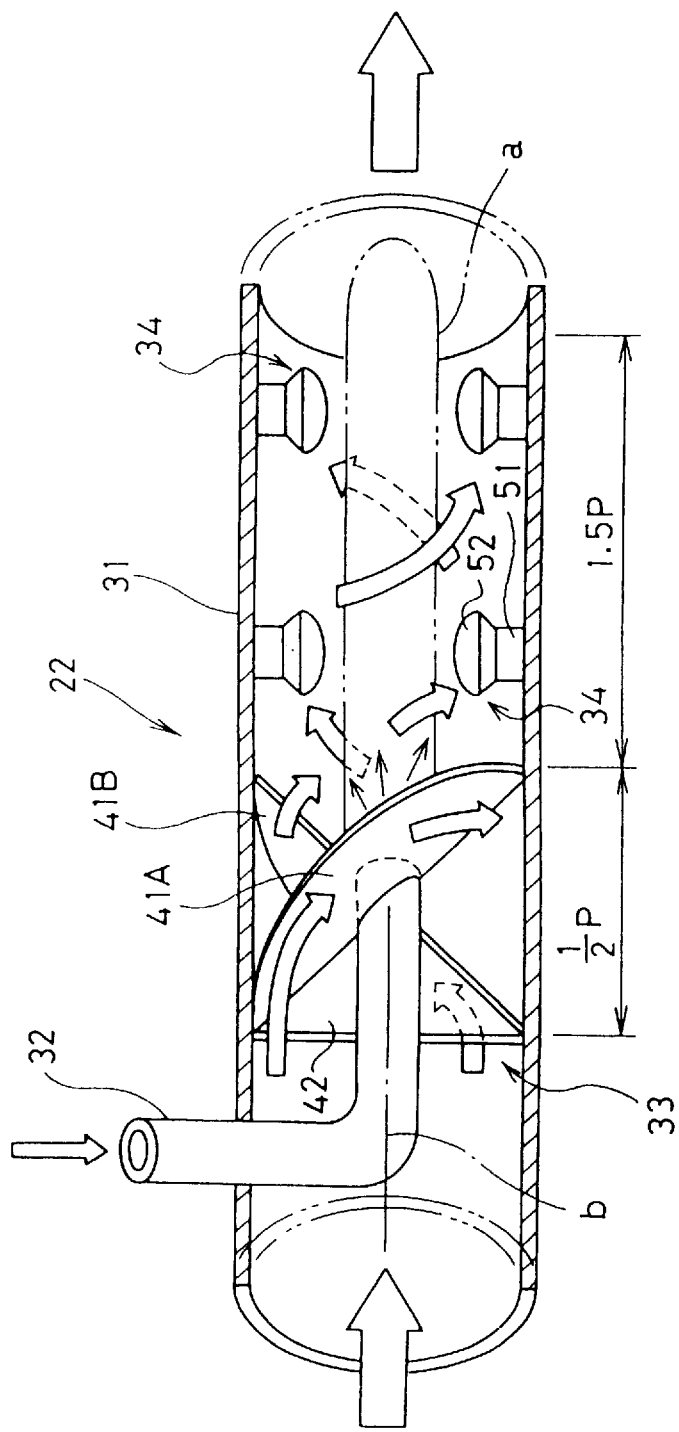
FIG. 3 is a partially cut-away perspective view illustrating an ozone injecting/mixing section of the water treatment system.
Figure 4:
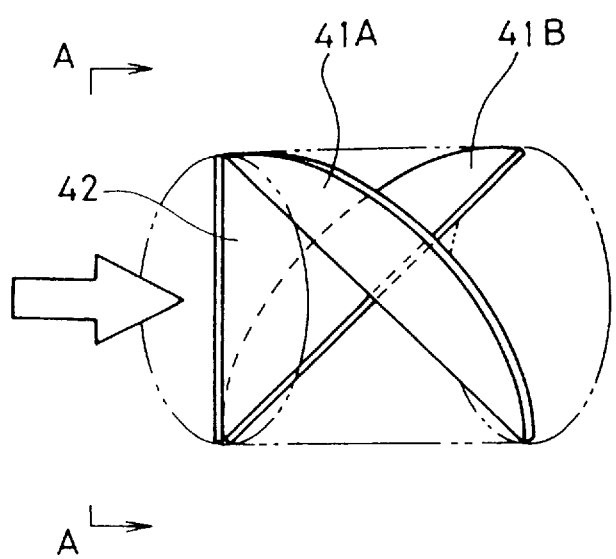
FIG. 4 is a perspective view illustrating a vane member of the ozone injecting/mixing section.
Figure 5:
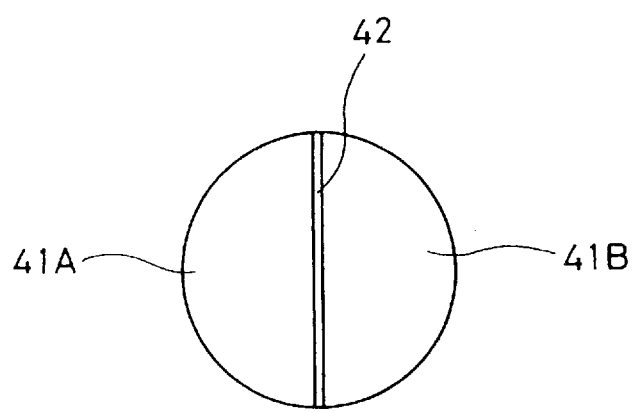
FIG. 5 is a sectional view taken along a line A—A in FIG. 4.

The vane member 33 and projections 34 of the ozone injecting/mixing section 22 will be described in detail with reference to FIGS. 3 to 5.

The vane member 33 includes a pair of semicircular vanes 41A and 41B each inclined at a predetermined angle (preferably, at 30° to 45°, for example) with respect to a direction of the flow of the water and provided crosswise in a twisted relation, and a partition 42 for dividing a space upstream of the intersection of the vanes 41A and 41B into two lateral portions.

The plurality of projections 34 are each comprised of a cylindrical portion (pillar portion) 51 fixed onto the interior wall of the mixing cylinder member 31 and a mushroom-like portion 52 formed at the top of the cylindrical portion 51. The projections 34 are arranged in a staggered (zigzag) fashion on the interior wall of the mixing cylinder member 31. An area where the projections 34 are arranged extends more than 1.5 times the twist pitch P of the vanes 41A and 41B. It should be noted that the vanes 41A and 41B shown are provided in a twisted relation in a range of P/2.

Figure 6:
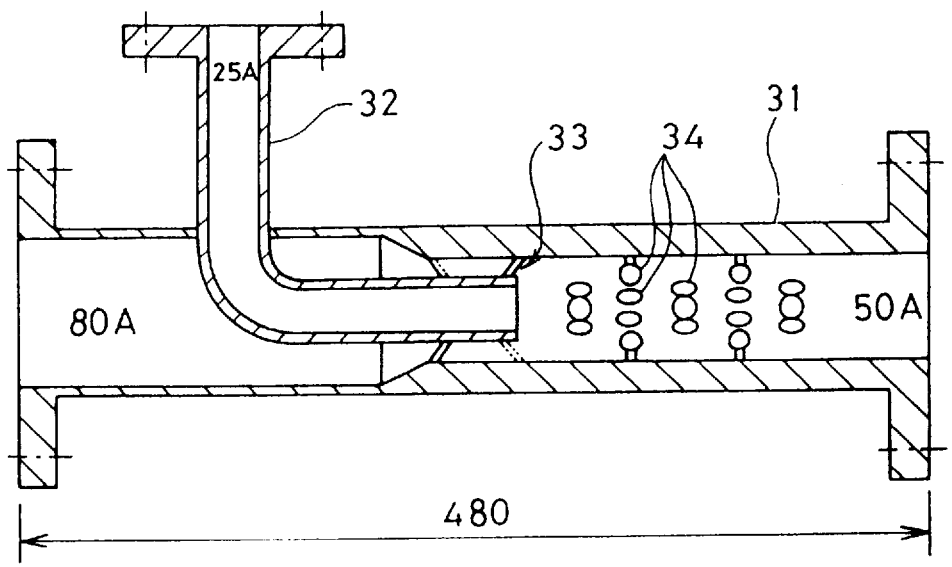
FIG. 6 is a sectional view illustrating a specific example of the ozone injecting/mixing section.

Specific dimensions of the ozone injecting/mixing section 22 are shown in FIG. 6, wherein 80A denotes the nominal caliber of a water introduction portion of the cylinder member 23 (inner diameter: 89.1 mm), 50A denotes the nominal caliber of a agitating/mixing portion of the cylinder member 23 (inner diameter: 60.5 mm), and 25A denotes the nominal caliber of the ozone injection tube 32 (inner diameter: 34.0 mm).

The ozone from the ozonizer is injected into the mixing cylinder member 31 by suction caused by the ejector effect of water flowing through the mixing cylinder member 31.

The magnet member has a magnetic force (magnetic flux density) of, for example, 1,000 gauss (an acceptable range of the magnetic force is from 1,000 gauss to 10,000 gauss). Under the application of the magnetic force, the flow rate of the water is adjusted at about 1.5 m/s. For example, a magnetic force for the flow rate of the water is 1,000 gauss/m$^3$·h.

Used as the filters 6 and 10 are volume-type filters which are capable of capturing particles of sizes greater than several microns. Used as a filter medium is a spherical filament filler. Alternatively, sand or the like may be used.

There will next be described operations in the water treatment process more specifically.

Examples of the water to be treated include waste water, ground water, river water, lake/marsh water, sea water and reservoir water. Such waters contain microorganisms, bacteria, organic substances, and soluble inorganic substances such as iron and manganese and, hence, have color or odor.

The water to be treated is temporarily stored in the reservoir 1, and then introduced through the transportation pipe line 3 into the first ozone mixer 5 by means of the pump 2.

In the first ozone mixer 5, the water is first subjected to a magnetic force having a magnetic flux density of 1,000 gauss to 10,000 gauss in the magnetic treatment section 21 and then transferred to the mixing cylinder member 31 of the ozone injecting/mixing section 22, in which ozone is injected (or sucked) from the first ozonizer 7 through the ozone injection tube 32 by the ejector effect.

In the first ozone mixer 5, inorganic oxides such as of iron and manganese in the water are precipitated as colloidal substances by the magnetic action, the ozone oxidization and the agitating/mixing action of the vane member 33 and projections 34. Where the sea water, river water, lake/marsh water or the like is to be treated, dead aquatic organisms are contained therein as suspended matter. The colloidal substances and suspended matter (hereinafter simply referred to as "suspended matter") are coagulated to sizes on the order of, for example, microns to dozens microns by the magnetic force.

It is considered that the coagulation by the application of the magnetic force is attributable to the fact that Lorentz's force affects charged particles dissolved in the water to produce a magnetohydrodynamic effect which promotes a crystallization/coagulation process of the charged particles.

More specifically, the surfaces of colloidal particles are negatively charged in the water, and the colloidal particles are maintained in a stably dispersed state by interparticle repulsion. However, when the water is passed through a magnetic field, ionic polarization occurs to produce an electric field, which neutralizes charges on the surfaces of the particles. This permits an interparticle attractive force (van der Waals attractive force) to bring the particles closer to each other for coagulation thereof.

The water subjected to the oxidization/coagulation process in the first ozone mixer 5 is introduced to the first filter 6, in which the suspended matter thus coagulated to sizes on the order of microns to dozens microns are removed.

The removal of the suspended matter increases the utilization factor of ozone in the subsequent step. More specifically, the suspended matter present in the water would consume ozone so that the ozone cannot effectively be used for oxidation of the organic substances and the like in the water. In avoidance thereof, the suspended matter must be removed from the water.

Detailed description will now be given to operations to be performed in the ozone injecting/mixing section of the ozone mixer.

One of the most important factors for effective utilization of ozone is how effectively ozone is brought into contact with the water. Particularly where the concentration of reactants contained in the water is low, the reaction rate is determined by the rate of diffusion of the reactants. Hence, vigorous agitation is required, which is performed in the ozone injecting/mixing section.

More specifically, the flow of the water subjected to the magnetic treatment is diverged by the partition 42 provided in the mixing cylinder member 31 into two lateral flows, which are each straightened. A strong twist force and acceleration force are applied to these two flows by the vanes 41A and 41B provided on the downstream side of the partition 42, thereby generating a vortex flow.

The vortex flow generates a multi-layer concentrically swirling flow within the mixing cylinder member 31. At this time, a cylindrical low-pressure portion a is formed along the axis of the flow, which portion varies depending on the sectional area of the flow channel and the minimum aperture sectional area of the swirling flow. Therefore, ozone is passively sucked from the ozone injection tube 32 having a tip portion inserted along an axis b of the mixing cylinder member 31.

The sucked ozone departs from the low pressure portion and enters the multi-layer swirling flow. Turbulent flows are generated in the multi-layer swirling flow due to a difference in the flow rate caused by a difference in the density, viscosity and the like of constituents the flow. By the action of the turbulent flows, the water is vigorously agitated in a first mixing process.

Thereafter, the multi-layer swirling flow enters the agitating/mixing portion provided with the projections 34, in which the flow is baffled by the cylindrical portions 51 and diverged in a radial direction of the cylinder member 31 by the mushroom-like portions 52.

The projections 34 are arranged in a staggered (zigzag) fashion within the area having a length greater than one twist pitch (e.g., 1.5 P) of the flow twisted by the vanes 41A and 41B. Therefore, the agitating/mixing operation is effectively performed by the diverging of the flow.

More specifically, when the flow of the water bumps against a mushroom-like portion 52, a cavitation is formed on the upstream side thereof, and a negative-pressure backwash is generated on the downstream side of the portion 52. Further, a separation of the boundary layer of the flow occurs at the hemispherical head of the mushroom-like portion 52.

Thus, the inside of the mixing cylinder member is filled with a large amount of turbulent flows, and constituent particles in the respective turbulent flows are commingled. Heavy substances flow outwardly and light substances flow inwardly, while bumping thereagainst each other and penetrating through the flow layers.

Ultrafine bubbles having diameters of about 0.5 microns to about 3 microns are generated in the flow bumping against the cylindrical portion 51 of the projection 34. The swirling flow containing such ultrafine bubbles bumps against the next projection 34, and the bubble density in the flow is increased. Further, the swirling flow generates ultrasonic waves (e.g., 40 kHz or greater).

Following the first high-speed agitating reaction process by means of the vane member 33, the second high-speed agitating reaction process is performed by such a vigorous diverging and bumping operation by means of the projections 34.

Here, results of a comparison test are shown in Table 1, which test was performed to evaluate the agitating/mixing performance of the aforesaid ozone injecting/mixing section 22 (hereinafter referred to as "mixer of the present invention") in comparison with a conventional mixer (hereinafter referred to as "mixer of reference"). The mixer of reference includes a plurality of rectangular plates each inclined at 180° to the right or to the left and the right-inclined plates and the left-inclined plates are sequentially and alternately arranged along the flow direction.

Shown in Table 1 are the amount of dissolved oxygen measured immediately after oxygen gas ($O_2$ gas) was blown into sea water (temperature: 12° C.) and the agitating/mixing operation was performed, and a fluid pressure difference $\Delta P$ between the upstream and downstream sides of the ozone injecting/mixing portion or the mixer of reference.

TABLE 1

|  | Reference | Present invention |
|---|---|---|
| Flow rate | 60 l/min. | 60 l/min. |
| Amount of blown $O_2$ | 3.5 l/min. | 3.5 l/min. |
| $O_2$ injection rate | 83 mg/l | 83 mg/l |
| $\Delta P$ | 0.5 kg/cm | 2.5 kg/cm |
| Dissolved $O_2$ concentration | 22 mg/l | 49 mg/l |

As can be seen from Table 1, the amount of oxygen dissolved in water agitated by means of the mixer of present invention is more than twice the amount of oxygen dissolved in water agitated by means of the mixer of reference. Thus, the mixer of present invention is excellent in the agitating/mixing performance.

The water filtered by the first filter 6 is introduced into the second ozone mixer 8, in which a mixing/oxidizing process is performed again using ozone injected from the second ozonizer 7. Of course, a magnetic force is applied to the water. In the second ozone mixer 8, substantially the same agitating/mixing effect as in the first ozone mixer 5 is ensured.

In the second ozone mixer 8, mainly organic substances, particularly difficult-to-decompose organic substances (COD substances), which have not reacted in the first ozone mixer 5, are oxidized by ozone. Most of the residual organic substances are subjected to oxidation. However, the difficult-to-decompose organic substances (macromolecular substances) are only subjected to a bond-cutting reaction and decomposed into lower-molecular substances, which may remain as organic substances (COD substances) in the water.

The water is then introduced from the second ozone mixer 8 to the reaction vessel 9 having granular activated carbon filled therein as a catalyst. In the reaction vessel, excessive ozone is decomposed, and the lower-molecular organic substances resulting from the ozone oxidation of the difficult-to-decompose organic substances are oxidized by the activated carbon and oxygen (DO) dissolved in the water in a high concentration for further decomposition thereof.

In the first and second ozone mixers 5 and 8, the oxygen concentration in the water reaches saturation by the injection of ozone. Where ozonizers of a PSA (pressure swing absorber) type are employed, the concentration of the dissolved oxygen reaches about 50 ppm to 60 ppm, for example.

The thus treated water which is clean and free from microorganisms, bacteria, organic substances, soluble inorganic substances and the like is stored in the treated-water reservoir 11, and is further subjected to a certain treatment, which depends on an application of the treated water.

There will next be explained an application of the aforesaid water treatment process to the treatment of sea water.

Constituents of the sea water before the treatment are shown in Table 2.

TABLE 2

| Constituent | PH | DO | COD | SS | Fe | Mn |
|---|---|---|---|---|---|---|
| Unit | — | mg/l | mg/l | mg/l | mg/l | mg/l |
| Analysis | 8.66 | 13.4 | 40 | 26 | 0.148 | 0.051 |

DO: Dissolved oxygen
SS: Suspended matter

The water treatment process for the sea water will be detailed below.

The sea water was introduced from the reservoir 1 into the first ozone mixer 5 at a flow rate of 220 l/min. by means of the pump 2, and ozone gas containing oxygen was supplied at a rate of 6 l/min. from the first ozonizer 4. At this time, the amount of the injected ozone was about 21 g/hour.

The water was introduced from the first ozone mixer 5 to the first filter 6, in which suspended matter and the like oxidized by ozone and coagulated by a magnetic force were filtered away. The water thus treated was introduced into the second ozone mixer 8.

In the second ozone mixer 8, ozone gas containing oxygen was supplied from the second ozonizer 7 at the same rate as supplied from the first ozonizer 4, i.e., at a rate of 6 l/min.

The water containing suspended matter subjected to oxidation and a magnetic treatment in the second ozone mixer 8 was introduced into the reaction vessel 9, in which excessive ozone contained in the sea water was decomposed by the granular activated carbon filled therein and organic substances were oxidized for decomposition. Thereafter, the water was introduced into the second filter 10, in which the suspended matter produced in the steps following the operation in the first filter 6 was filtered away from the water. The water thus treated was stored in the treated-water reservoir 11.

The results of analyses of the water after the respective process steps are shown in Table 3.

TABLE 3

| Constituent | PH | DO | COD | SS | Fe | Mn |
|---|---|---|---|---|---|---|
| Unit | — | mg/l | mg/l | mg/l | mg/l | mg/l |
| First magnetic treatment reaction vessel (outlet) | 8.66 | 49.5 | 40 | 23 | — | — |
| First filter (outlet) | 8.65 | 49.2 | 40 | 12 | 0.081 | 0.036 |
| Second magnetic treatment reaction vessel (outlet) | 8.63 | 55.3 | 6.9 | 11 | — | — |
| Reaction vessel (outlet) | 8.68 | 55.1 | 6.5 | 12 | 0.066 | 0.014 |
| Second filter (outlet) | 8.67 | 52.2 | 6.5 | 6.0 | — | — |

DO: Dissolved oxygen
SS: Suspended matter

In the aforesaid experiment, the water treatment system was operated 10 hours a day for 50 days. During the operation, the system presented no problem.

In the aforesaid water treatment process and system, when water is treated with ozone for oxidation, colloidal substances resulting from oxidation of inorganic substances and suspended matter resulting from oxidation of organic substances can be coagulated by subjecting the water to a magnetic force without the use of a coagulant or a like agent. Therefore, an apparatus for adding the coagulant, a reaction vessel for reaction with the coagulant, an ozone dissolution vessel and the like can be dispensed with and, hence, the water treatment system can be simplified.

With the arrangement of the ozone mixer, particularly the ozone injecting/mixing section, of the water treatment system of the present invention, the pair of vanes provided in the mixing cylinder portion diverge the water flow into two flows, which are twisted in opposite directions. The flows are further diverged by the projections provided on the downstream side and deflected in a radial direction of the mixing cylinder member. Thus, the vigorous diverging/bumping action of the flows causes ozone to react with the water at a high rate.

INDUSTRIAL APPLICABILITY

As described above, the water treatment process and system according to the present invention are very effective for water treatment employing ozone, in which inorganic substances to be oxidized and organic substances contained in waste water, river water and the like are coagulated for removal thereof.

I claim:

1. A water treatment process for treating inorganic and organic particles for removal from untreated water, said process comprising the steps of:

applying a magnetic force to the water and injecting ozone into the water for oxidation and coagulation primarily of inorganic substances in the water;

filtering away coagulated substances from the water, thereby increasing a utilization factor of ozone to be injected in a subsequent step;

applying a magnetic force to the filtered water and injecting ozone into the filtered water for oxidation and coagulation primarily of organic substances remaining in the water; and passing the treated water through a catalytic layer of activated carbon for aiding oxidation of the organic substances.

2. A water treatment process as set forth in claim 1, further comprising the step of filtering away coagulated substances after the water is passed through the catalytic layer.

3. A water treatment system comprising:

first and second ozone generators (4,7);

a first magnetic treatment reaction vessel (5) including a magnetic treatment section (21) for introducing therein water to be treated and applying a predetermined magnetic force to the water, and an ozone injecting/mixing section (22) for injecting ozone generated by the first ozone generator (4) into the water introduced from the magnetic treatment section and agitating the water;

a first filter (6) for filtering away coagulated substances from the water introduced from the first magnetic treatment reaction vessel;

a second magnetic treatment vessel reaction vessel (8) including a magnetic treatment section (21) for introducing therein the water from the first filter and applying a predetermined magnetic force to the water, and an ozone injecting/mixing section (22) for injecting ozone generated by the second ozone generator (7) into the water introduced from the magnetic treatment section and mixing the ozone with the water;

a reaction vessel (9) in which the water introduced from the second magnetic treatment reaction vessel is subjected to oxidation and decomposition by a catalytic layer of activated carbon; and a second filter (10) for filtering away coagulated substances from the water introduced from the reaction vessel; and wherein the ozone injecting/mixing section (22) of each magnetic treatment reaction vessel (5, 8) includes:

a mixing cylinder member (31);

an ozone injection tube (32) inserted from an upstream side of the mixing cylinder member;

a vane member (33) provided adjacent to the ozone injection tube within the mixing cylinder member for agitating and mixing the water; and a plurality of projections provided on a downstream side of the vane member within the mixing cylinder member; wherein the vane member (33) includes a pair of semicircular vanes (41A, 41B) inclined at a predetermined angle with respect to a flow direction of the water and arranged in a twisted relation;

the ozone injecting/mixing section (22) further comprises a partition (42) for dividing a space upstream of the intersection of the pair of vanes into two lateral portions;

the plurality of projections (34) each have a cylindrical portion (51) fixed onto an interior wall of the mixing cylindrical member (31) and an enlarged dome shaped portion (52) provided atop the cylindrical portion, the projections being arranged in a staggered fashion on the interior wall of the mixing cylinder member; and an end of the ozone injection tube (32) is inserted through the vane member (33) so as to face toward the projections (34).

4. A water treatment system comprising:

first and second ozone generators (4.7);

a first magnetic treatment reaction vessel (5) including a magnetic treatment section (21) for introducing therein water to be treated and applying a predetermined magnetic force to the water, and an ozone injecting/mixing section (22) for injecting ozone generated by the first ozone generator (4) into the water introduced from the magnetic treatment section and agitating the water:

a first filter (6) for filtering away coagulated substances from the water introduced from the first magnetic treatment reaction vessel;

a second magnetic treatment vessel reaction vessel (8) including a magnetic treatment section (21) for introducing therein the water from the first filter and applying a predetermined magnetic force to the water, and an ozone injecting/mixing section (22) for injecting ozone generated by the second ozone generator (7) into the water introduced from the magnetic treatment section and mixing the ozone with the water;

a reaction vessel (9) in which the water introduced from the second magnetic treatment reaction vessel is subjected to oxidation and decomposition by a catalytic layer of activated carbon; and a second filter (10) for filtering away coagulated substances from the water introduced from the reaction vessel; and wherein the ozone injecting/mixing section (22) of each magnetic treatment reaction vessel (5,8) includes:

a mixing cylinder member (31);

an ozone injection tube (32) inserted from an upstream side of the mixing cylinder member;

a vane member (33) provided adjacent to the ozone injection tube within the mixing cylinder member for agitating and mixing the water; and a plurality of projections provided on a downstream side of the vane member within the mixing cylinder member; wherein the vane member (33) includes a pair of semicircular vanes (41A, 41B) inclined at a predetermined angle with respect to a flow direction of the water and arranged in a twisted relation;

the ozone injecting/mixing section (22) further comprises a partition (42) for dividing a space upstream of the intersection of the pair of vanes into two lateral portions;

the plurality of projections (34) each have a cylindrical portion (51) fixed onto an interior wall of the mixing cylinder member (31) and an enlarged dome shaped portion (52) provided atop the cylindrical portion, the projections being arranged in a staggered fashion on the interior wall of the mixing cylinder member;

an end of the ozone injection tube (32) is inserted through the vane member (33) so as to face toward the projections (34); and the magnetic treatment section (21) of the magnetic treatment reaction vessel (5,8) comprises a cylinder member (23) and a bar magnet member (25) inserted therethrough so as to provide annular clearance (24) with respect to an interior wall (23a).

5. A water treatment system comprising:

first and second ozone generators (4.7);

a first magnetic treatment reaction vessel (5) including a magnetic treatment section (21) for introducing therein water to be treated and applying a predetermined magnetic force to the water, and an ozone injecting/mixing section (22) for injecting ozone generated by the first ozone generator (4) into the water introduced from the magnetic treatment section and agitating the water;

a first filter (6) for filtering away coagulated substances from the water introduced from the first magnetic treatment reaction vessel;

a second magnetic treatment vessel reaction vessel (8) including a magnetic treatment section (21) for introducing therein the water from the first filter and applying a predetermined magnetic force to the water, and an ozone injecting/mixing section (22) for injecting ozone generated by the second ozone generator (7) into the water introduced from the magnetic treatment section and mixing the ozone with the water;

a reaction vessel (9) in which the water introduced from the second magnetic treatment reaction vessel is subjected to oxidation and decomposition by a catalytic layer of activated carbon; and a second filter (10) for filtering away coagulated substances from the water introduced from the reaction vessel; and wherein the ozone injecting/mixing section (22) of each magnetic treatment reaction vessel (5, 8) includes:
a mixing cylinder member (31);
an ozone injection tube (32) inserted from an upstream side of the mixing cylinder member;
a vane member (33) provided adjacent to the ozone injection tube within the mixing cylinder member for agitating and mixing the water; and a plurality of projections provided on a downstream side of the vane member within the mixing cylinder member; wherein the vane member (33) includes a pair of semicircular vanes (41A, 41B) inclined at a predetermined angle with respect to a flow direction of the water and arranged in a twisted relation;

the ozone injecting/mixing section (22) further comprises a partition (42) for dividing a space upstream of the intersection of the pair of vanes into two lateral portions;

the plurality of projections (34) each have a cylindrical portion (51) fixed onto an interior wall of the mixing cylinder member (31) and an enlarged dome shaped portion (52) provided atop the cylindrical portion, the projections being arranged in a staggered fashion on the interior wall of the mixing cylinder member;

an end of the ozone injection tube (32) is inserted through the vane member (33) so as to face toward the projections (34);

the magnetic treatment section (21) of the magnetic treatment reaction vessel (5, 8) comprises a cylinder member (23) and a bar magnet member (25) inserted therethrough so as to provide annular clearance (24) with respect to an interior wall (23a); and the bar magnet member (25) includes a plurality of small cylindrical magnets arranged in series and the small cylindrical magnets adjacent to each other are arranged such that N-poles and S-poles thereof are arrayed alternatively.

\* \* \* \* \*

UNITED STATES PATENT AND TRADEMARK OFFICE
CERTIFICATE OF CORRECTION

PATENT NO. : 5,888,403
DATED : March 30, 1999
INVENTOR(S) : Yukiko Hayashi

It is certified that error appears in the above-indentified patent and that said Letters Patent is hereby corrected as shown below:

Title page, Inventor field, "2239-2, Kurotsuchi-cho, Sakai-shi, Osaka-fu" should read -- 2339-2, Kurotsuchi-cho, Sakai-shi, Osaka 591 -- .

Signed and Sealed this

Twenty-second Day of May, 2001

*Attest:*

NICHOLAS P. GODICI

*Attesting Officer*     *Acting Director of the United States Patent and Trademark Office*